(12) United States Patent
Chen et al.

(10) Patent No.: US 10,108,074 B1
(45) Date of Patent: Oct. 23, 2018

(54) OPTICAL ENGINE MODULE

(71) Applicant: QISDA CORPORATION, Taoyuan (TW)

(72) Inventors: You-Yi Chen, Taoyuan (TW); Sheng-Wen Hu, New Taipei (TW); Wen-Chung Ho, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 15/862,643

(22) Filed: Jan. 5, 2018

(30) Foreign Application Priority Data

Dec. 19, 2017 (CN) .......................... 2017 1 1371336

(51) Int. Cl.
*G03B 21/20* (2006.01)
*H04N 9/31* (2006.01)
*F21V 8/00* (2006.01)
*G03B 21/14* (2006.01)
*G02B 26/00* (2006.01)
*G03B 33/08* (2006.01)

(52) U.S. Cl.
CPC ......... *G03B 21/145* (2013.01); *G02B 6/0096* (2013.01); *G02B 26/008* (2013.01); *G03B 21/2006* (2013.01); *G03B 21/208* (2013.01); *G03B 33/08* (2013.01); *H04N 9/3129* (2013.01); *H04N 9/3152* (2013.01)

(58) Field of Classification Search
CPC .... G03B 21/145; G03B 21/208; G03B 21/28; H04N 9/3152; H04N 9/3141; G02B 6/0096; G02B 6/4298
USPC .................................. 385/133, 901; 362/581
See application file for complete search history.

(56) References Cited

U.S. PATENT DOCUMENTS

2007/0109778 A1* 5/2007 Chang .................... G03B 21/14
362/220

* cited by examiner

*Primary Examiner* — Ryan Howard

(57) ABSTRACT

An optical engine module includes a casing, a bracket, a light pipe, a cover and a resilient member. The casing has an accommodating space and a baffle, wherein the baffle is located in the accommodating space. A first end of the bracket has at least one first block portion, the bracket is disposed in the accommodating space, and a second end of the bracket is oriented towards the baffle, wherein the first end is opposite to the second end. The light pipe is disposed in the bracket and abuts against the at least one first block portion. The cover is disposed on the second end of the bracket and abuts against the baffle. The resilient member is configured to generate an elastic force to push the bracket towards the baffle.

19 Claims, 20 Drawing Sheets

OPTICAL ENGINE MODULE

BACKGROUND OF THE INVENTION

1. Field of the Invention

The invention relates to an optical engine module and, more particularly, to an optical engine module capable of being assembled without glue.

2. Description of the Prior Art

Recently, projectors are getting more and more popular. With the capacity of video playing, projectors are applied not only for common office meetings, but also for various seminars or academic courses. In general, a projector may comprise various optical components including a lens, a light source, an optical engine module and so on, wherein the light source is configured to emit light beam and the light beam is processed by the optical engine module and then projected to form an image through the lens. Accordingly, the optical engine module is an important optical component in the projector. When assembling the optical engine module, the prior art needs to use glue to fix a light pipe in a bracket and use glue to fix a cover on an end of the bracket, so as to prevent the light pipe and the cover from coming off the bracket. If the glue (e.g. UV resin) is not cured completely or the temperature is too high, the glue may evaporate easily and then pollute the optical components. Furthermore, the glue may be carbonized and then become invalid.

SUMMARY OF THE INVENTION

An objective of the invention is to provide an optical engine module capable of being assembled without glue, so as to solve the aforesaid problems.

According to an embodiment of the invention, an optical engine module comprises a casing, a bracket, a light pipe, a cover and a resilient member. The casing has an accommodating space and a baffle, wherein the baffle is located in the accommodating space. A first end of the bracket has at least one first block portion, the bracket is disposed in the accommodating space, and a second end of the bracket is oriented towards the baffle, wherein the first end is opposite to the second end. The light pipe is disposed in the bracket and abuts against the at least one first block portion. The cover is disposed on the second end of the bracket and abuts against the baffle. The resilient member is configured to generate an elastic force to push the bracket towards the baffle.

As mentioned in the above, the invention disposes the cover on an end of the bracket towards the baffle and utilizes the resilient member to generate the elastic force to push the bracket towards the baffle, such that the cover is compressed by the bracket and abuts against the baffle. At this time, the cover is sandwiched in between the bracket and the baffle, and the light pipe is retained in the bracket by the block portion of the bracket and the cover. Accordingly, the light pipe can be fixed in the bracket and the cover can be fixed on an end of the bracket without glue when assembling the optical engine module of the invention. Since the optical engine module is assembled without glue, the optical engine module can be reassembled with high stability.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
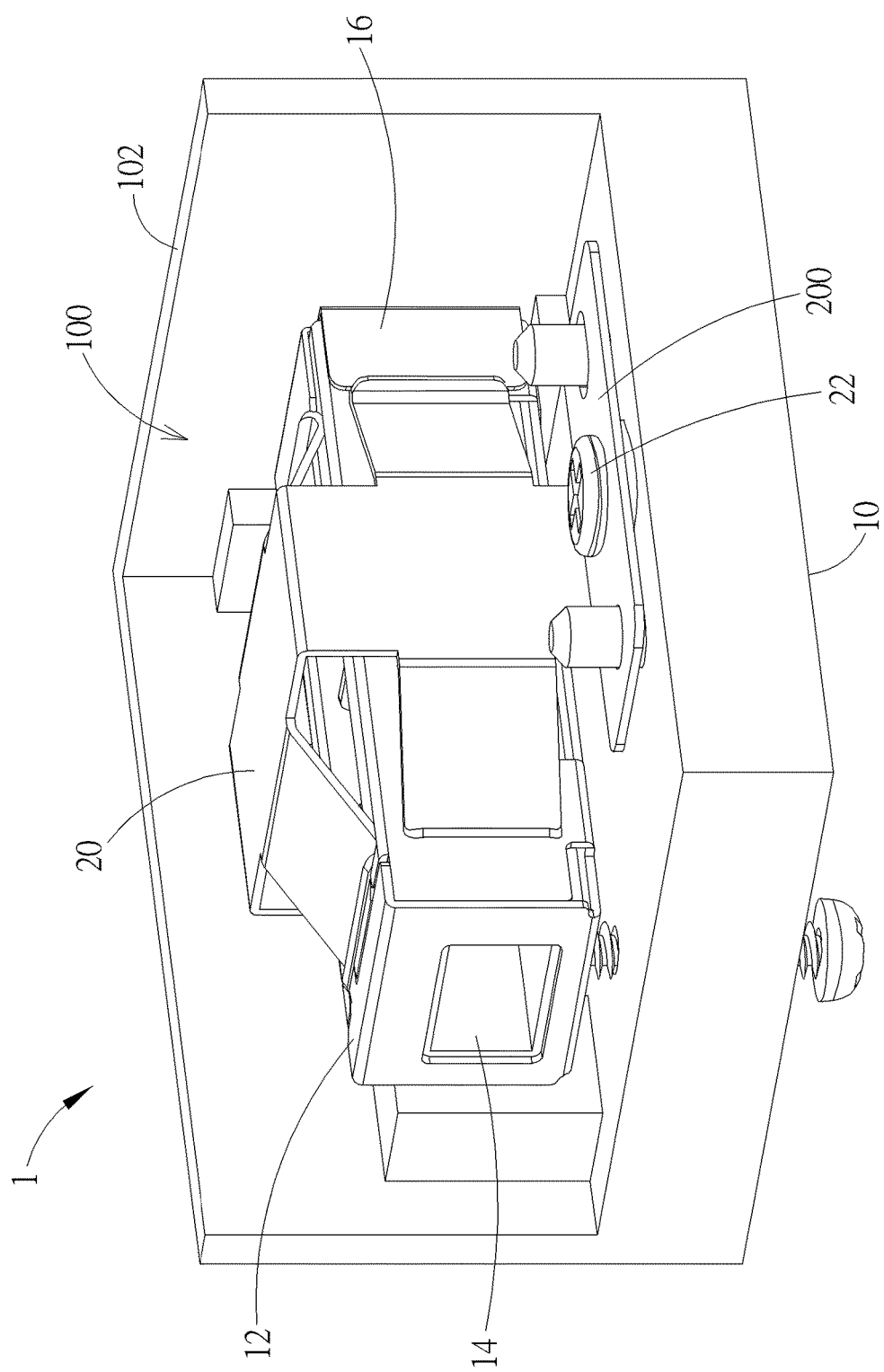
FIG. 1 is a perspective view illustrating an optical engine module according to an embodiment of the invention.
Figure 2:
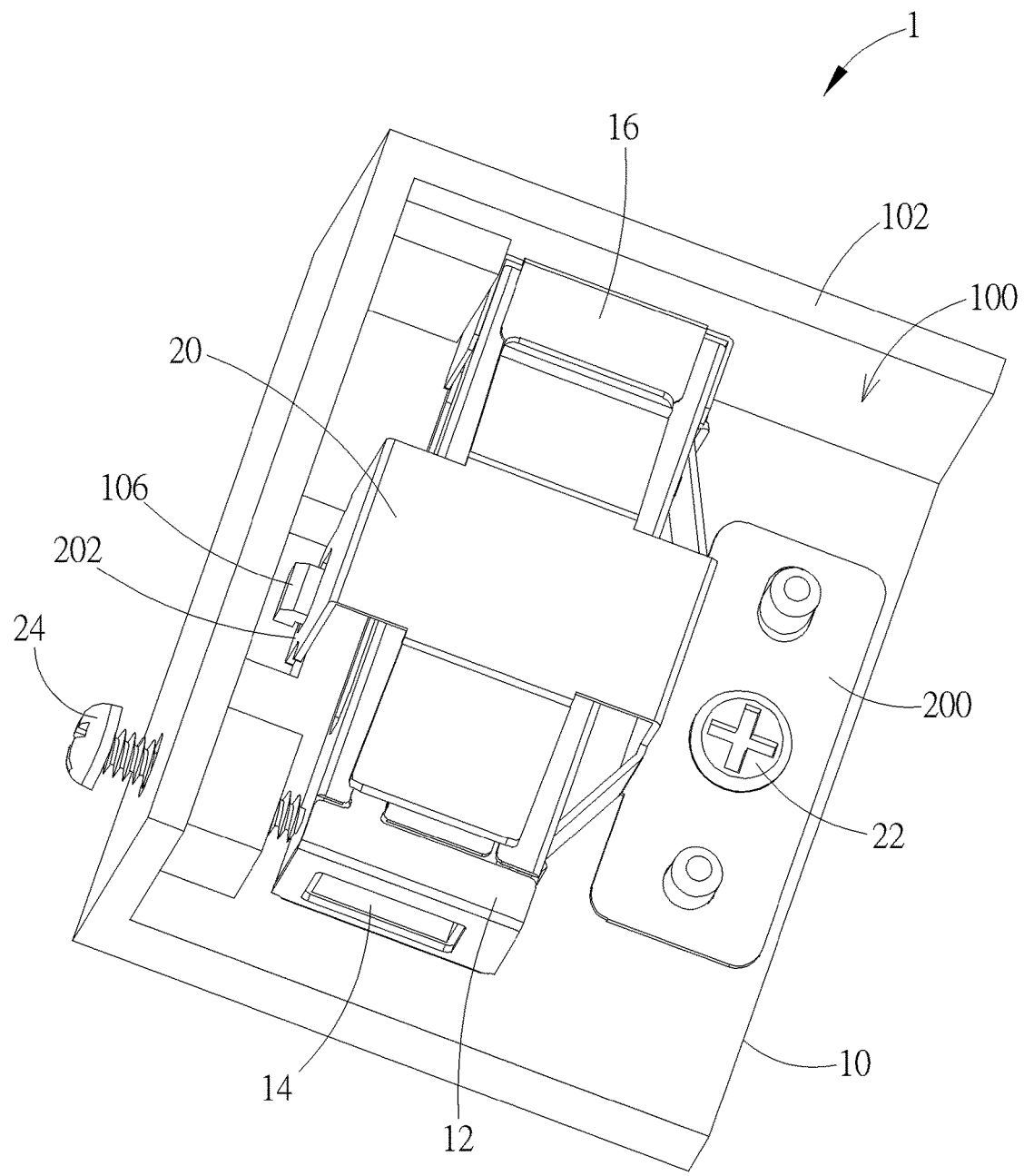
FIG. 2 is a perspective view illustrating the optical engine module shown in FIG. 1 from another viewing angle.
Figure 3:
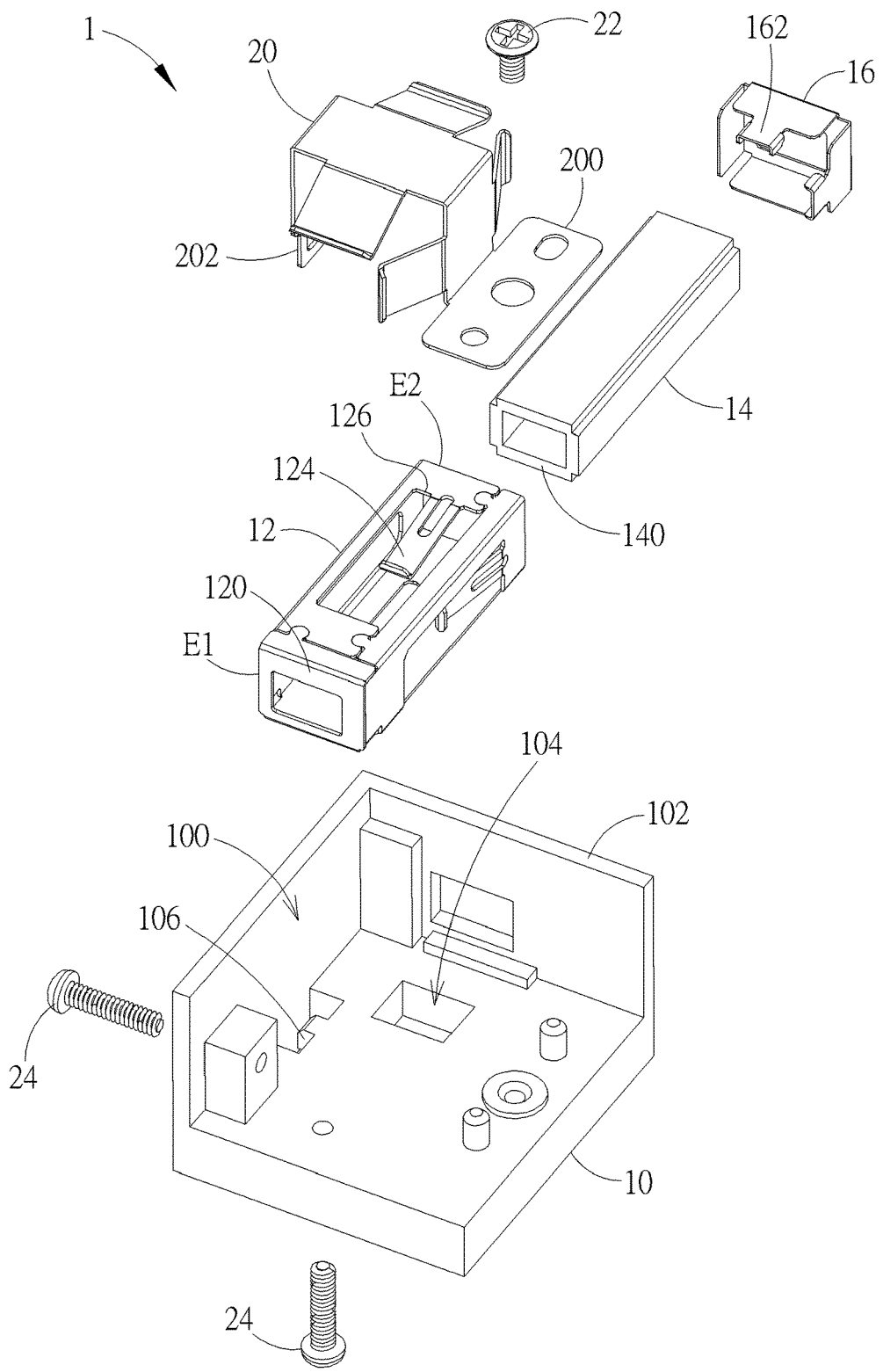
FIG. 3 is an exploded view illustrating the optical engine module shown in FIG. 1.
Figure 4:
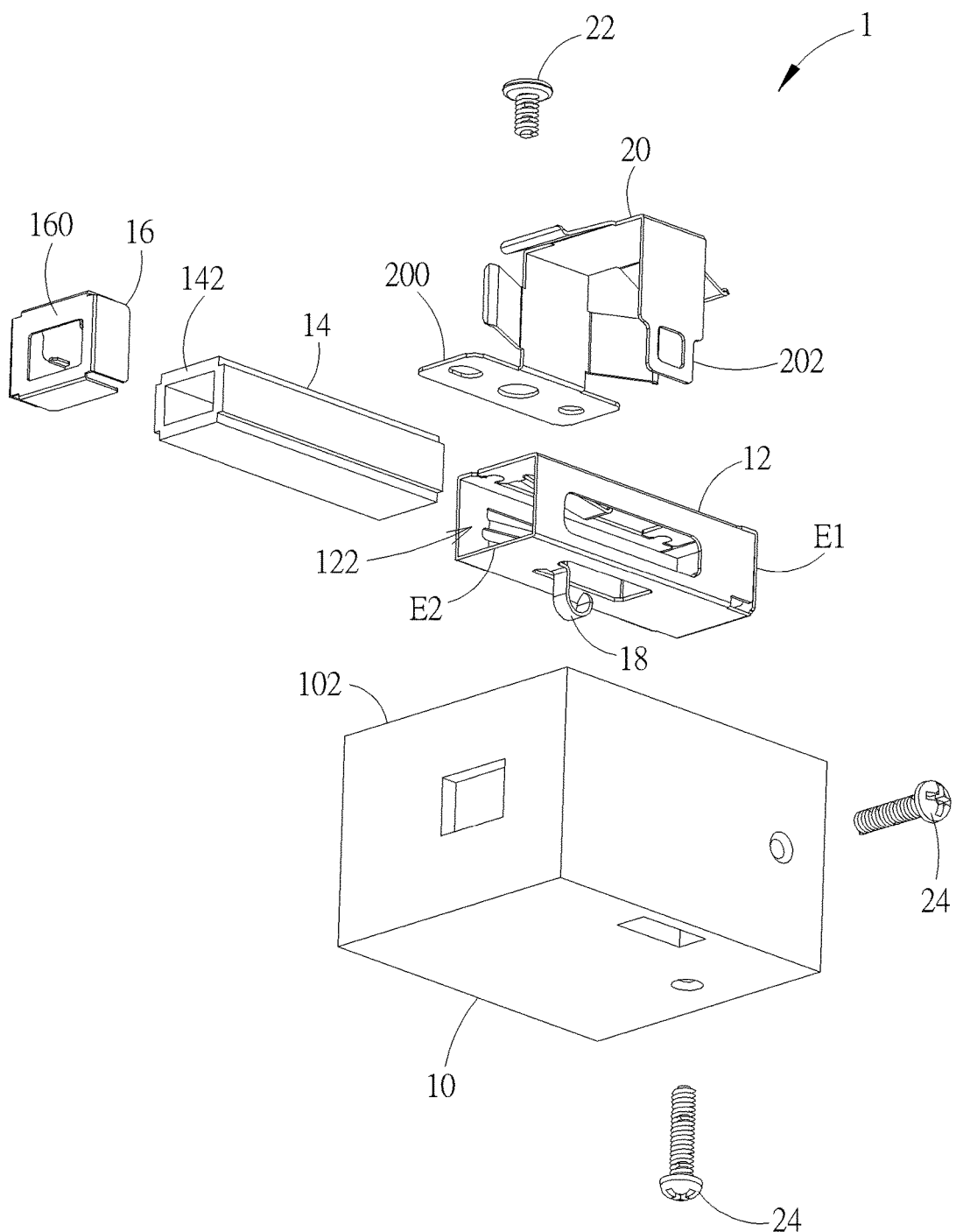
FIG. 4 is an exploded view illustrating the optical engine module shown in FIG. 1 from another viewing angle.
Figure 5:
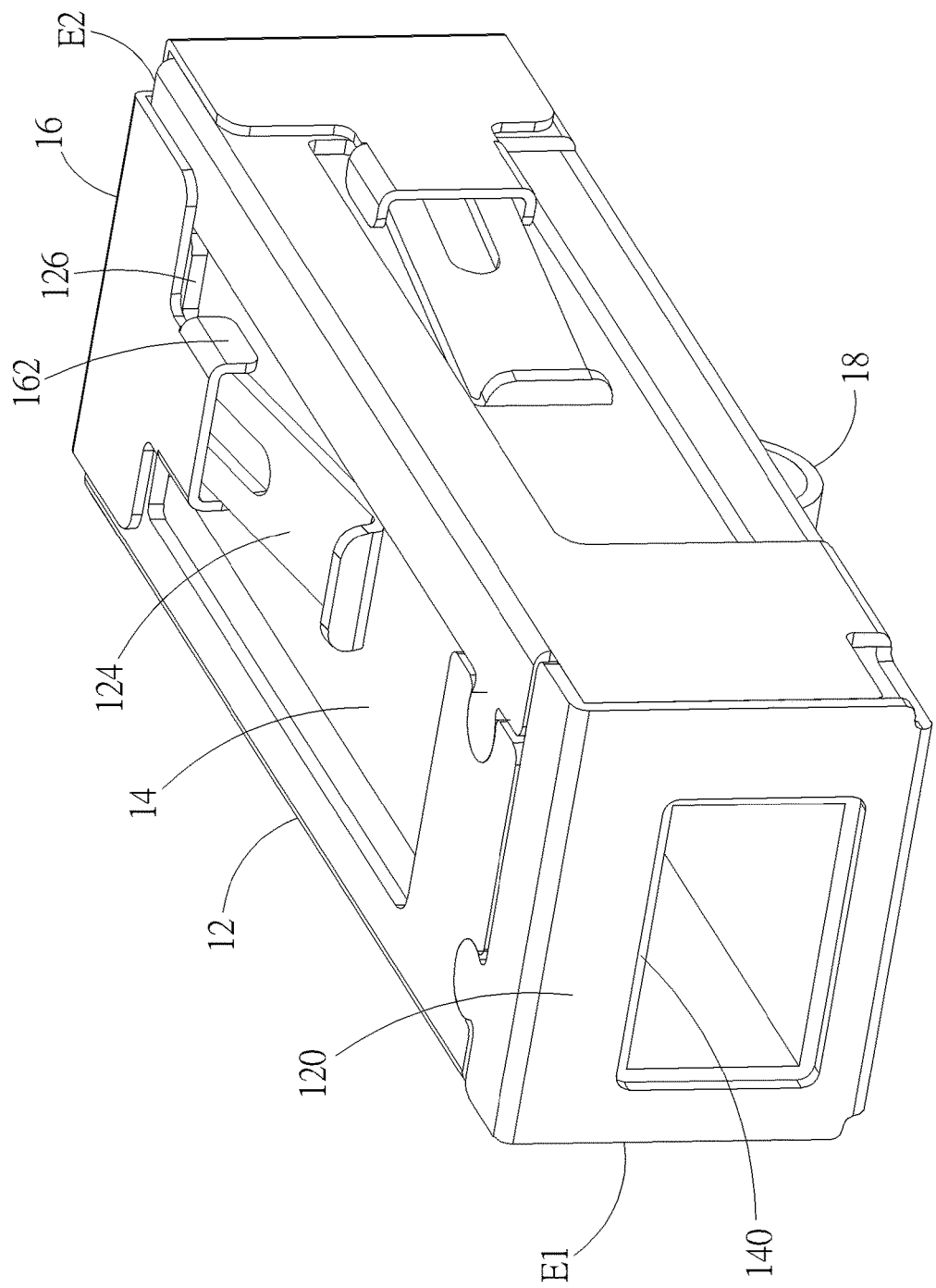
FIG. 5 is an assembly view illustrating the bracket, the light pipe and the cover shown in FIG. 3.
Figure 6:
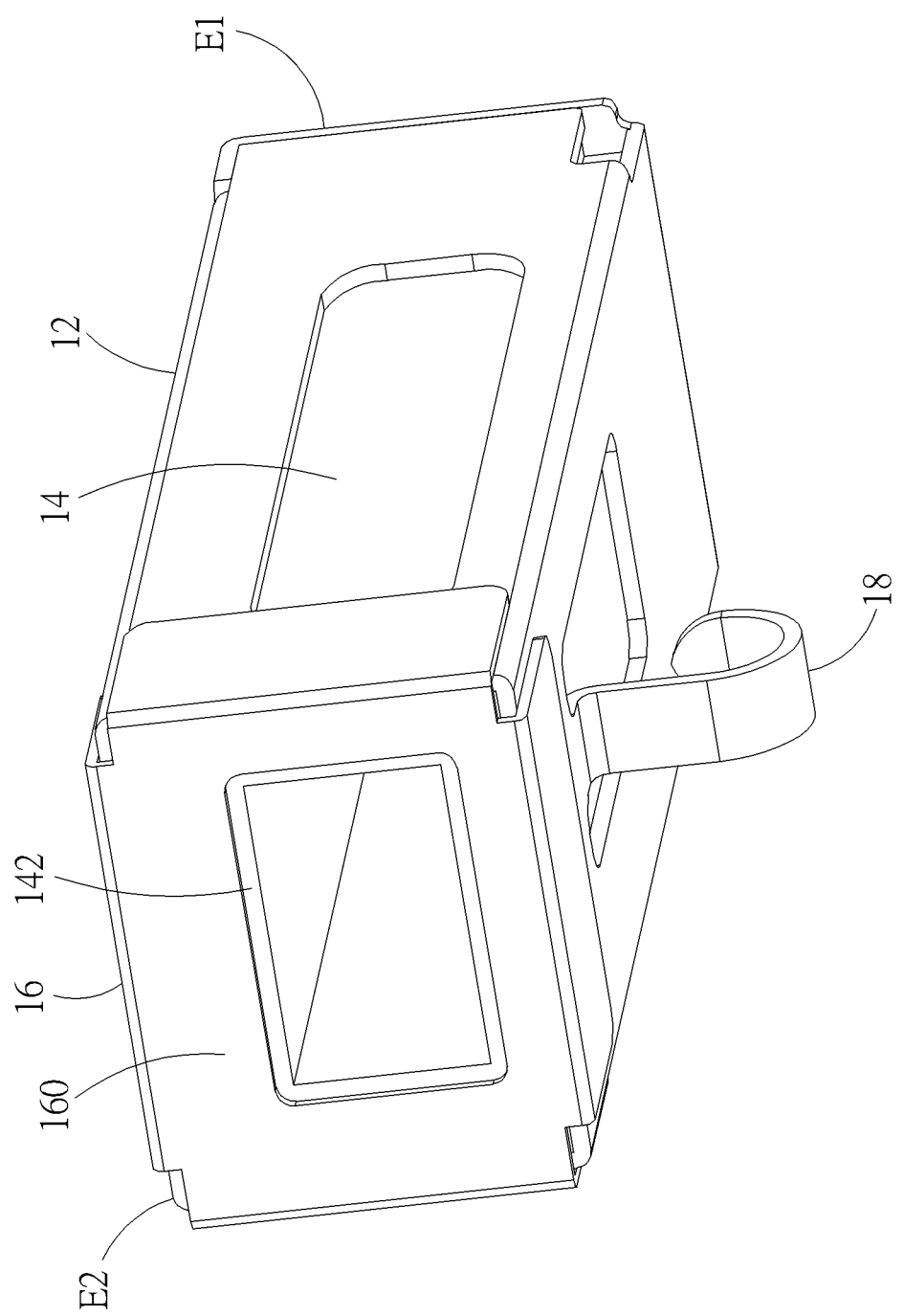
FIG. 6 is a perspective view illustrating the bracket, the light pipe and the cover shown in FIG. 5 from another viewing angle.
Figure 7:
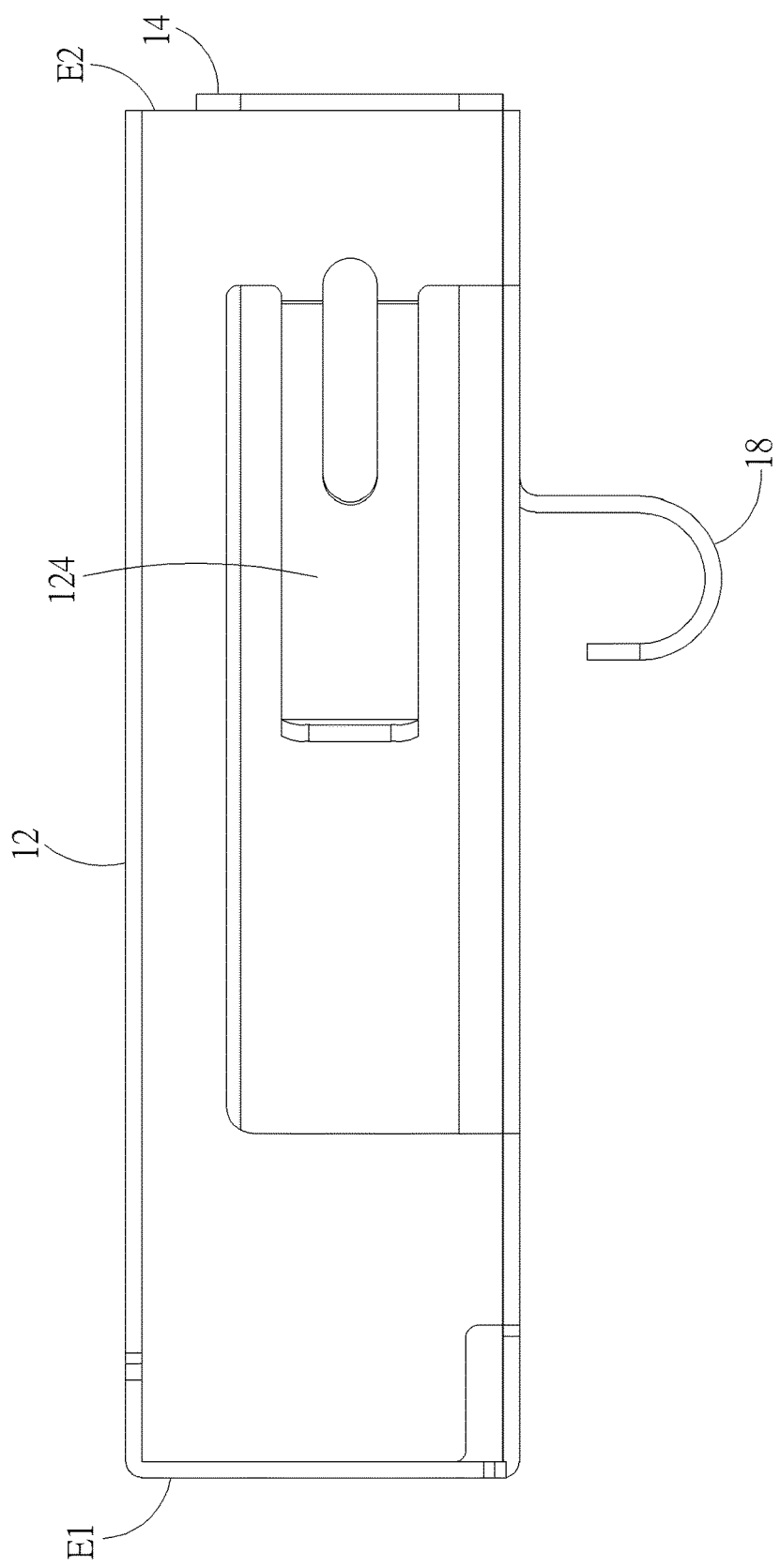
FIG. 7 is a side view illustrating the light pipe shown in FIG. 3 being disposed in the bracket.

Referring to FIGS. 1 to 8, FIG. 1 is a perspective view illustrating an optical engine module 1 according to an embodiment of the invention, FIG. 2 is a perspective view illustrating the optical engine module 1 shown in FIG. 1 from another viewing angle, FIG. 3 is an exploded view illustrating the optical engine module 1 shown in FIG. 1, FIG. 4 is an exploded view illustrating the optical engine module 1 shown in FIG. 1 from another viewing angle, FIG. 5 is an assembly view illustrating the bracket 12, the light pipe 14 and the cover 16 shown in FIG. 3, FIG. 6 is a perspective view illustrating the bracket 12, the light pipe 14 and the cover 16 shown in FIG. 5 from another viewing angle, FIG. 7 is a side view illustrating the light pipe 14 shown in FIG. 3 being disposed in the bracket 12, and FIG.

8 is a side view illustrating the bracket 12, the light pipe 14 and the cover 16 shown in FIG. 5 being disposed in the accommodating space 100 of the casing 10.

As shown in FIGS. 1 to 4, the optical engine module 1 comprises a casing 10, a bracket 12, a light pipe 14, a cover 16 and a resilient member 18. The optical engine module 1 is adapted to a projector. The casing 10 has an accommodating space 100 and a baffle 102, wherein the baffle 102 is located in the accommodating space 100. In this embodiment, the baffle 102 and the casing 10 may be formed integrally. Furthermore, the accommodating space 100 has a recess 104. A first end E1 of the bracket 12 has at least one first block portion 120 and a second end E2 of the bracket 12 has an opening 122 allowing the light pipe 14 to pass through, wherein the first end E1 is opposite to the second end E2. In this embodiment, the resilient member 18 may be a C-shaped resilient arm, and the resilient member 18 and the bracket 12 may be formed integrally. For example, the resilient member 18 may be formed by bending a part of the bracket 12 from one side.

To assemble the optical engine module 1, the light pipe 14 is disposed in the bracket 12 through the opening 122 of the bracket 12 first, such that the light pipe 14 abuts against the first block portion 120 of the bracket 12. In this embodiment, the first end E1 of the bracket 12 may have four first block portions 120, so as to utilize the four first block portions 120 to block four edge sections 140 of the light pipe 14, as shown in FIG. 5. It should be noted that the first block portion 120 may block the edge section 140 wholly or partially according to practical applications. Furthermore, the bracket 12 may have two resilient arms 124 located at two adjacent sides of the bracket 12. When the light pipe 14 is disposed in the bracket 12, the two resilient arms 124 abut against two adjacent sides of the light pipe 14, such that the light pipe 14 contacts the inner surface of the bracket 12 tightly.

Then, the cover 16 is disposed on the second end E2 of the bracket 12 to cover the opening 122, as shown in FIG. 6. In this embodiment, a length of the light pipe 14 is larger than a length of an inner space of the bracket 12, such that the light pipe 14 protrudes from the bracket 12 slightly when the light pipe 14 is disposed in the bracket 12, as shown in FIG. 7. Accordingly, when the cover 16 is disposed on the second end E2 of the bracket 12, the cover 16 contacts the light pipe 14, such that the light pipe 14 is retained in the bracket 12 by the first block portion 120 of the bracket 12 and the cover 16. Furthermore, the cover 16 may have at least two second block portions 160 and the at least two second block portions 160 block at least two edge sections 142 of the light pipe 14. In this embodiment, the cover 16 may have four second block portions 160. When the cover 16 is disposed on the second end E2 of the bracket 12, the four second block portions 160 block four edge sections 142 of the light pipe 14, as shown in FIG. 6. It should be noted that the second block portion 160 may block the edge section 142 wholly or partially according to practical applications. Moreover, the second end E2 of the bracket 12 may have at least one first engaging portion 126 and the cover 16 may have at least one second engaging portion 162. When the cover 16 is disposed on the second end E2 of the bracket 12, the first engaging portion 126 is engaged with the second engaging portion 162, so as to prevent the cover 16 from coming off the bracket 12. In this embodiment, the second end E2 of the bracket 12 may have two first engaging portions 126 and the cover 16 may have two second engaging portions 162, but are not so limited.

After assembling the bracket 12, the light pipe 14 and the cover 16, the bracket 12 is disposed in the accommodating space 100 of the casing 10 and the second end E2 of the bracket 12 is oriented towards the baffle 102, such that the cover 16 abuts against the baffle 102. When the bracket 12 is disposed in the accommodating space 100 of the casing 10, the resilient member 18 is embedded in the recess 104 and deforms elastically to generate an elastic force. The elastic force generated by the resilient member 18 pushes the bracket 12 towards the baffle 102, such that the cover 16 is compressed by the bracket 12 and abuts against the baffle 102. At this time, the cover 16 is sandwiched in between the bracket 12 and the baffle 102. Accordingly, the light pipe 14 can be fixed in the bracket 12 and the cover 16 can be fixed on the second end E2 of the bracket 12 without glue when assembling the optical engine module 1 of the invention.

In this embodiment, the optical engine module 1 may further comprise a pressing member 20. A side of the pressing member 20 has a fixing portion 200 and another side of the pressing member 20 has an engaging portion 202. As shown in FIG. 2, the fixing portion 200 of the pressing member 20 may be fixed on the casing 10 by a fixing member 22 (e.g. screw) and the engaging portion 202 of the pressing member 20 may be engaged with an engaging portion 106 of the casing 10, such that the pressing member 20 presses the bracket 12 on the casing 10. Furthermore, the optical engine module 1 may further comprise two adjusting screws 24 for adjusting a horizontal angle and a vertical angle of the bracket 12 and the light pipe 14.

Figure 9:
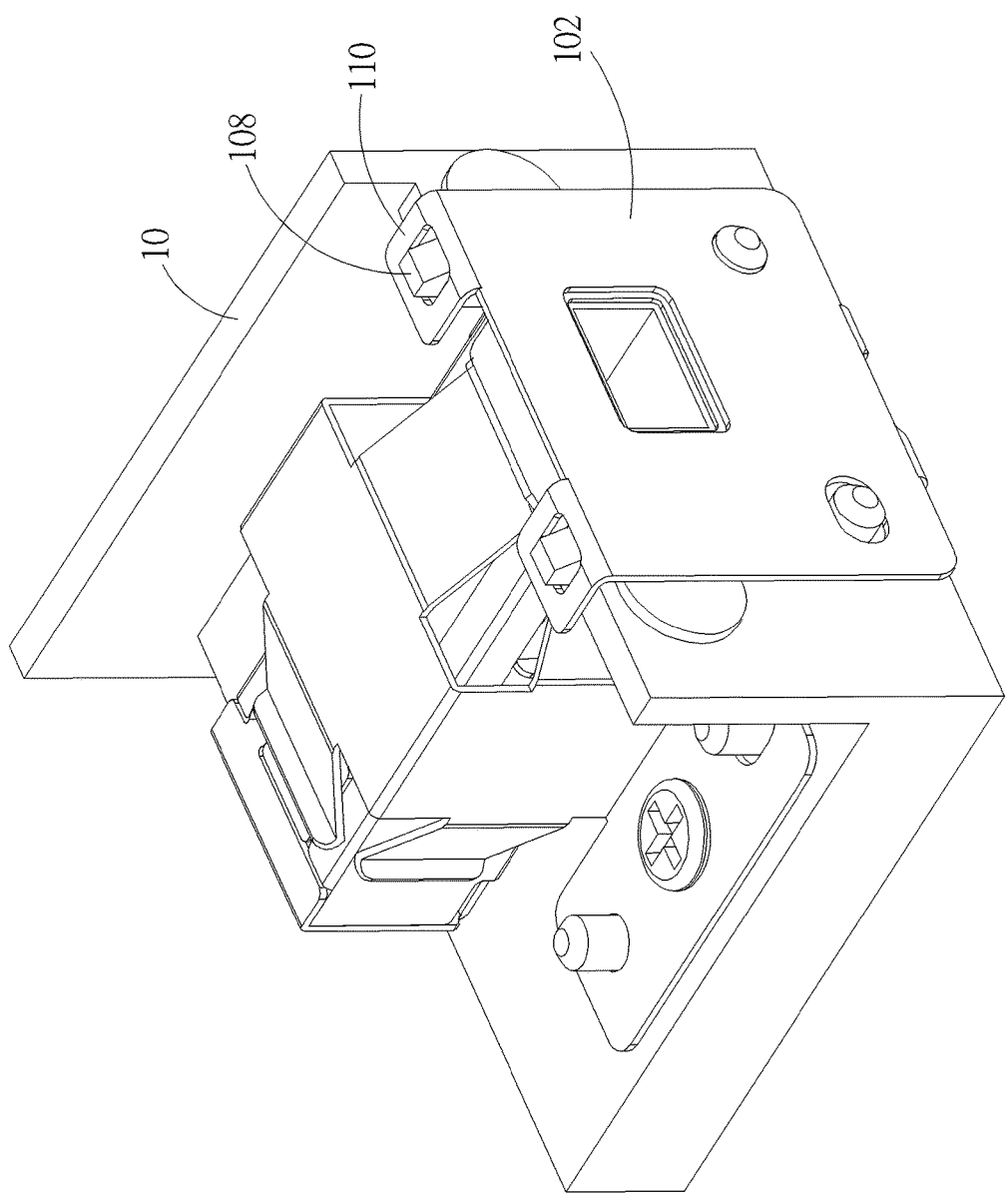
FIG. 9 is a perspective view illustrating the casing according to another embodiment of the invention
Figure 10:
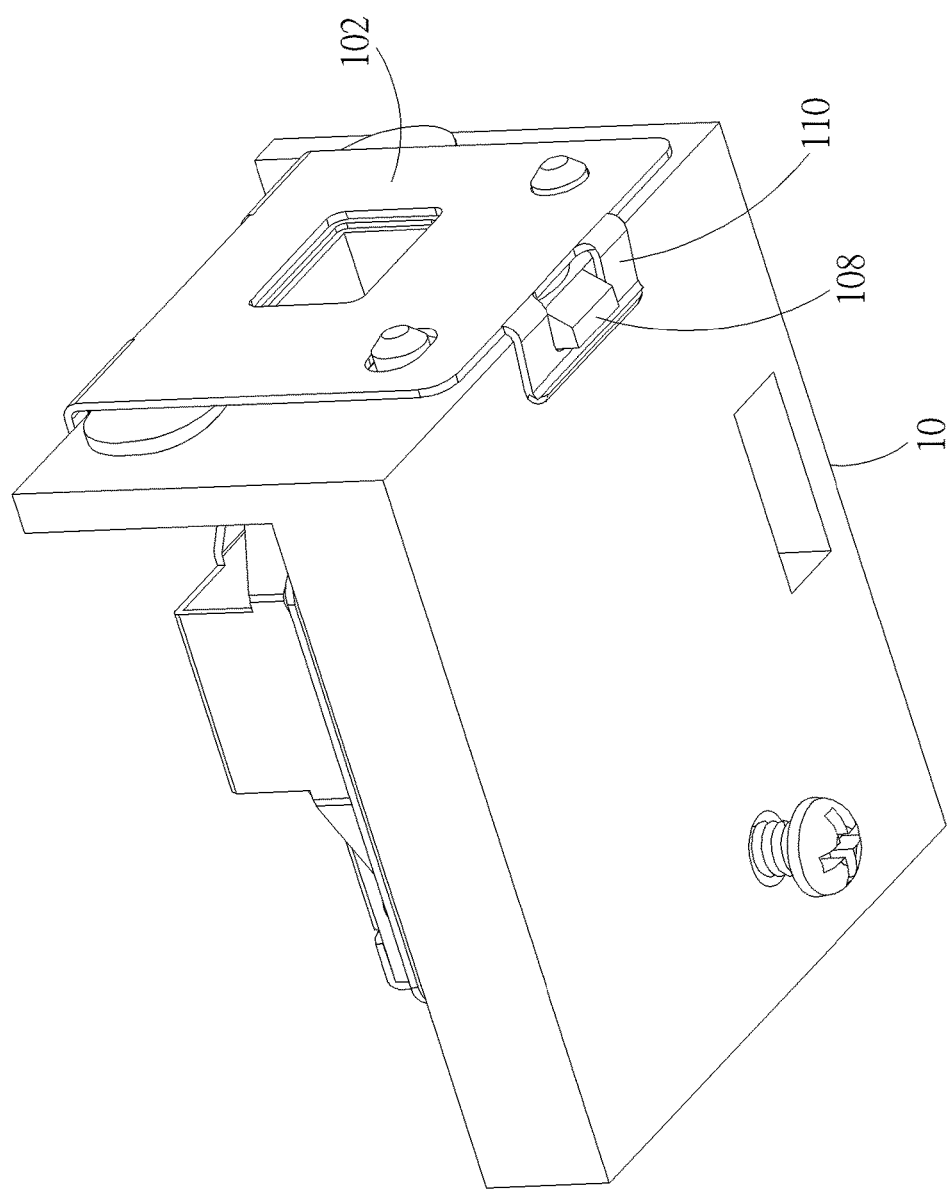
FIG. 10 is a perspective view illustrating the casing shown in FIG. 9 from another viewing angle.
Figure 11:
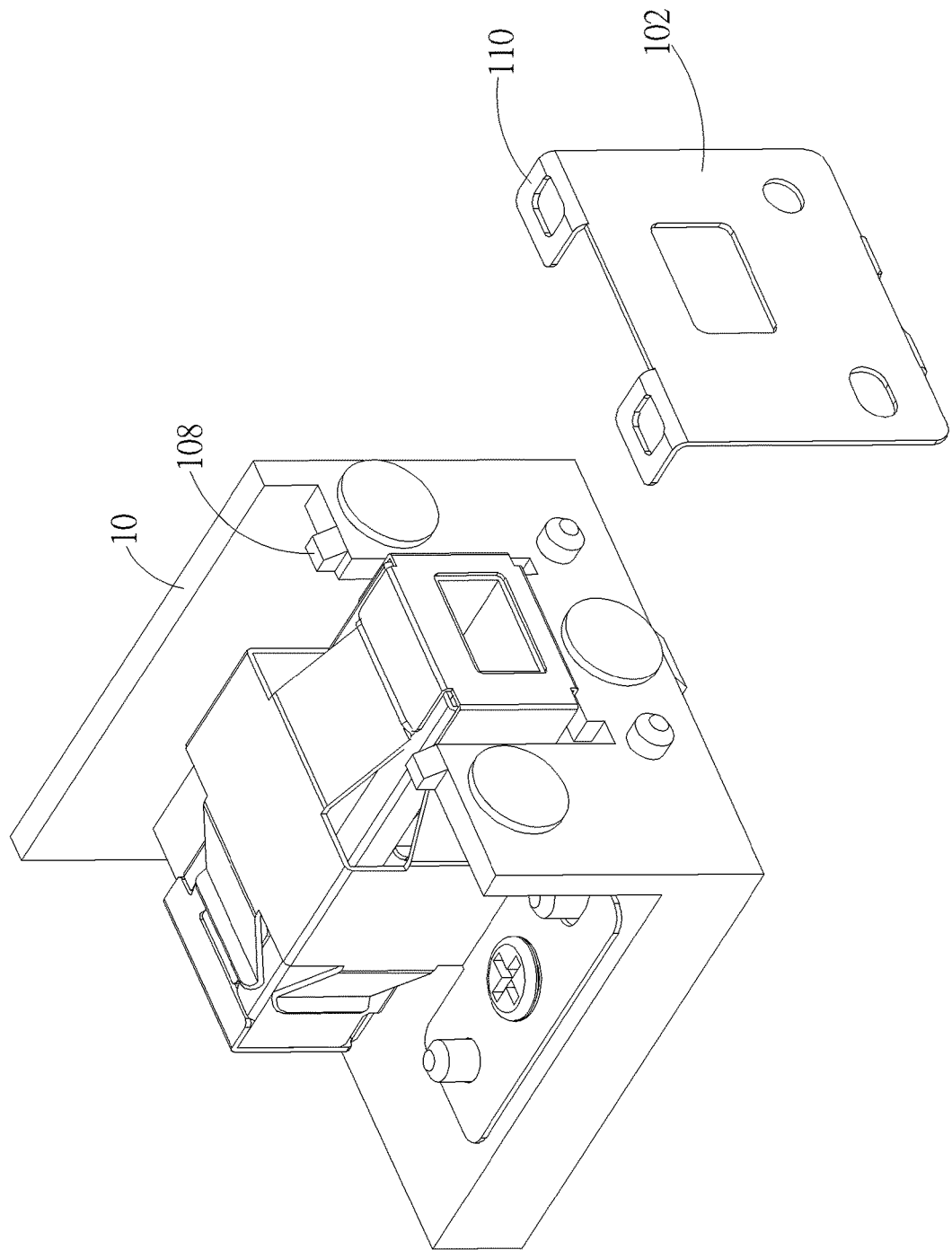
FIG. 11 is a perspective view illustrating the baffle shown in FIG. 9 being detached from the casing.

Referring to FIGS. 9 to 11, FIG. 9 is a perspective view illustrating the casing 10 according to another embodiment of the invention, FIG. 10 is a perspective view illustrating the casing 10 shown in FIG. 9 from another viewing angle, and FIG. 11 is a perspective view illustrating the baffle 102 shown in FIG. 9 being detached from the casing 10. In this embodiment, the baffle 102 is detachably connected to the casing 10. As shown in FIGS. 9 to 11, the casing 10 may have a plurality of engaging portions 108 and the baffle 102 may have a plurality of engaging portions 110. The engaging portions 108 and the engaging portions 110 can be engaged with each other, such that the baffle 102 is detachably connected to the casing 10.

Figure 12:
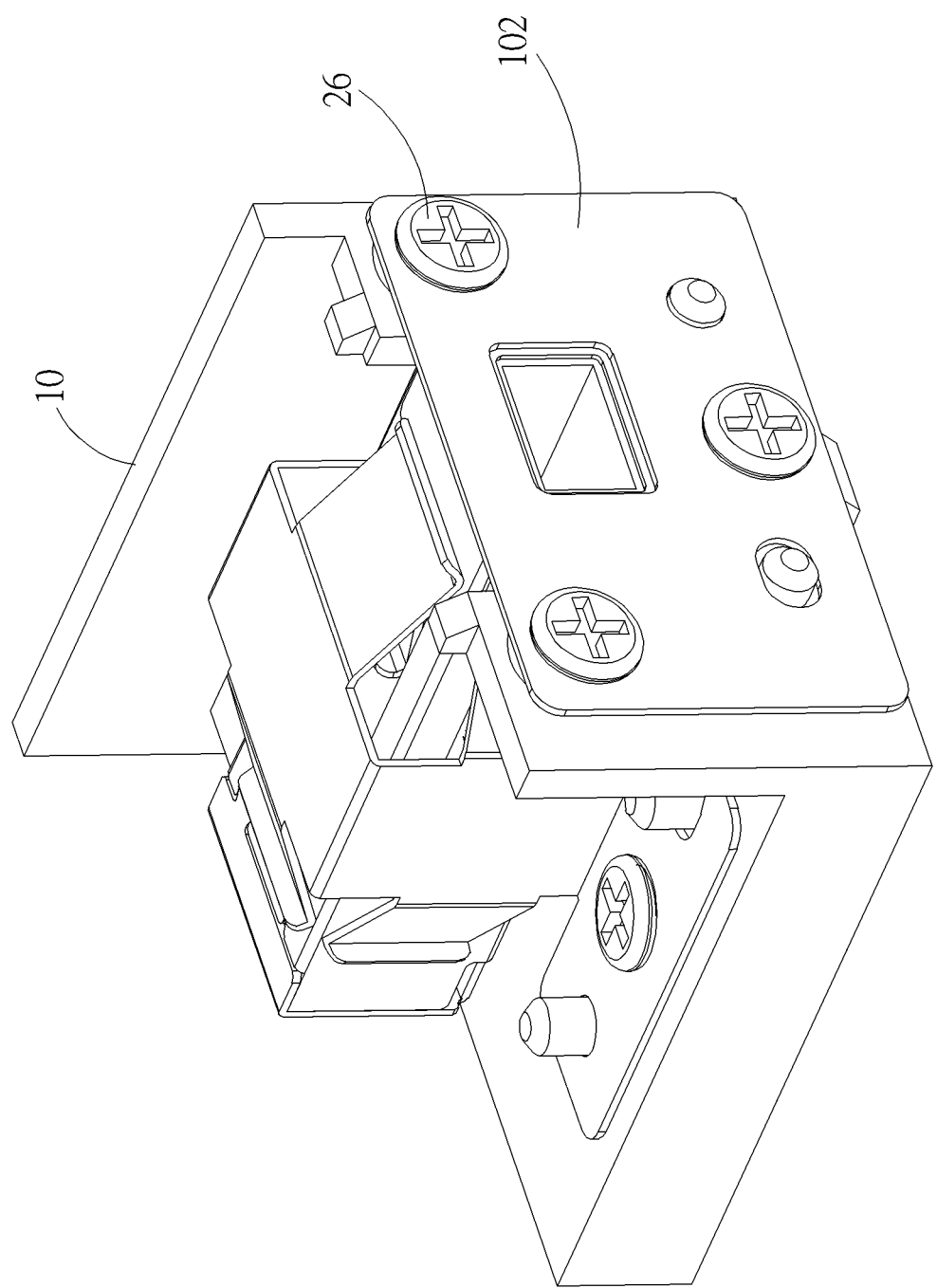
FIG. 12 is a perspective view illustrating the casing according to another embodiment of the invention.
Figure 13:
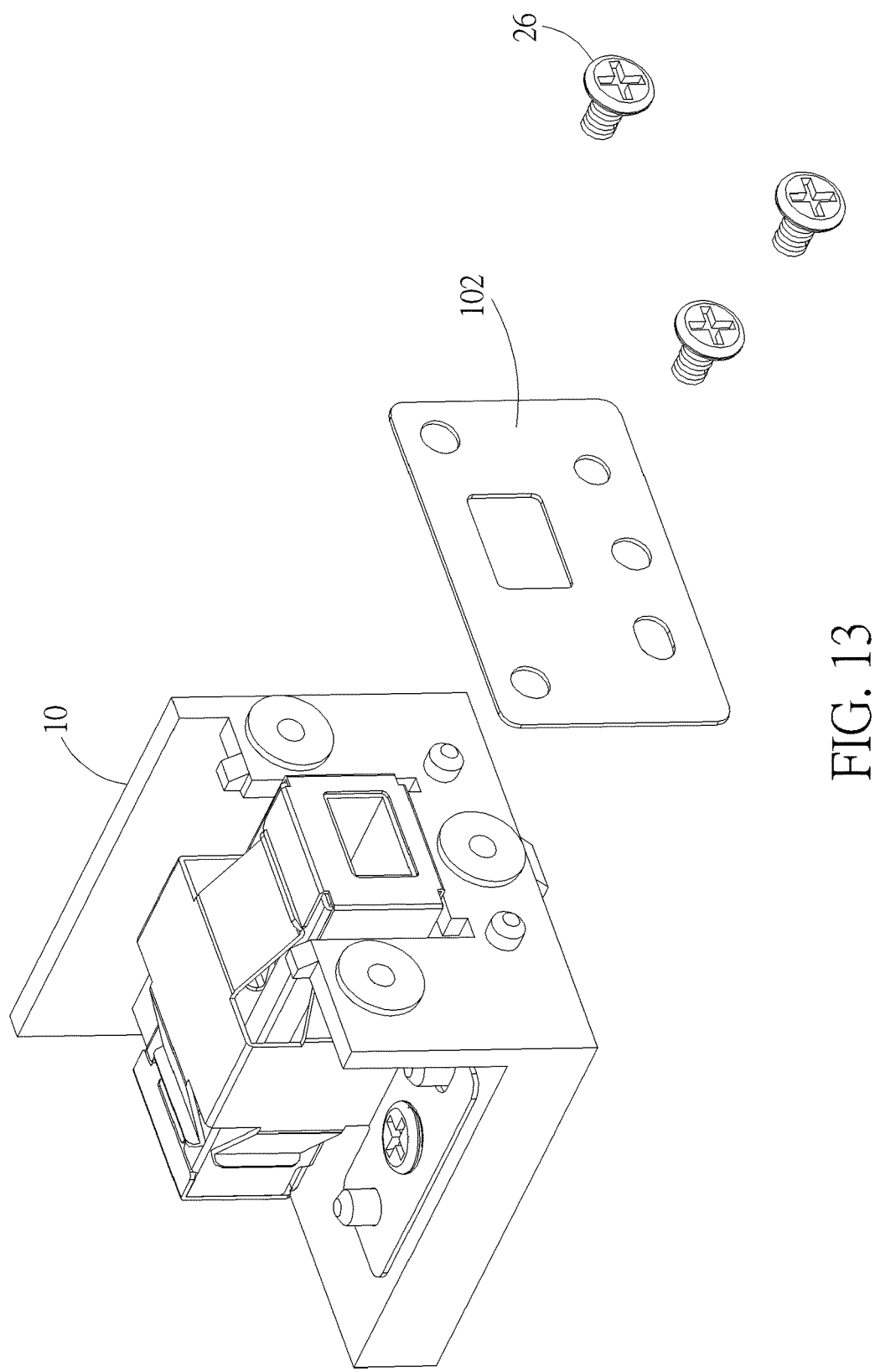
FIG. 13 is a perspective view illustrating the baffle shown in FIG. 12 being detached from the casing.

Referring to FIGS. 12 and 13, FIG. 12 is a perspective view illustrating the casing 10 according to another embodiment of the invention and FIG. 13 is a perspective view illustrating the baffle 102 shown in FIG. 12 being detached from the casing 10. In this embodiment, the baffle 102 is detachably connected to the casing 10. As shown in FIGS. 12 and 13, the baffle 102 may be fixed on the casing 10 by fixing members 26 (e.g. screws), such that the baffle 102 is detachably connected to the casing 10.

Figure 14:
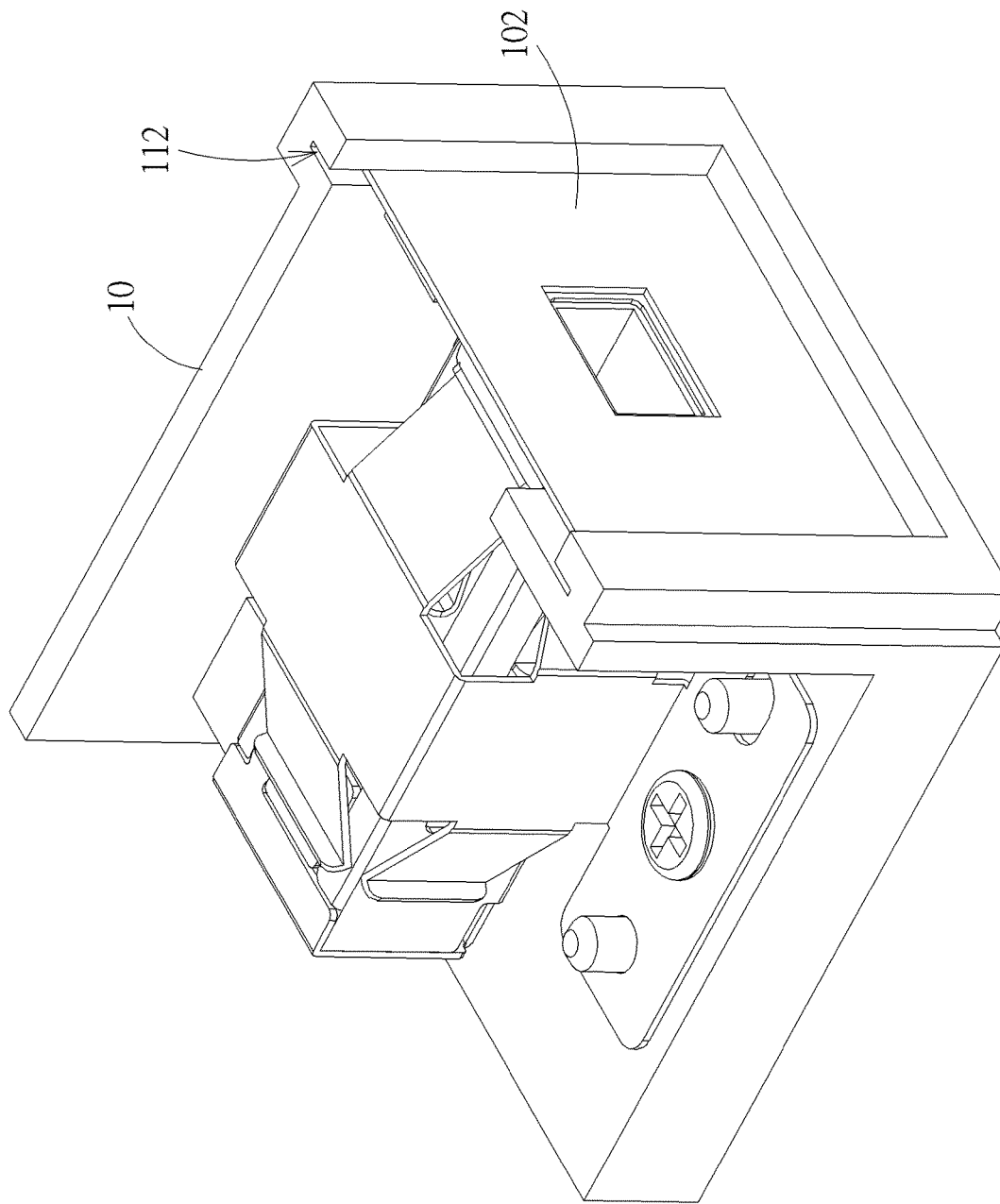
FIG. 14 is a perspective view illustrating the casing according to another embodiment of the invention.
Figure 15:
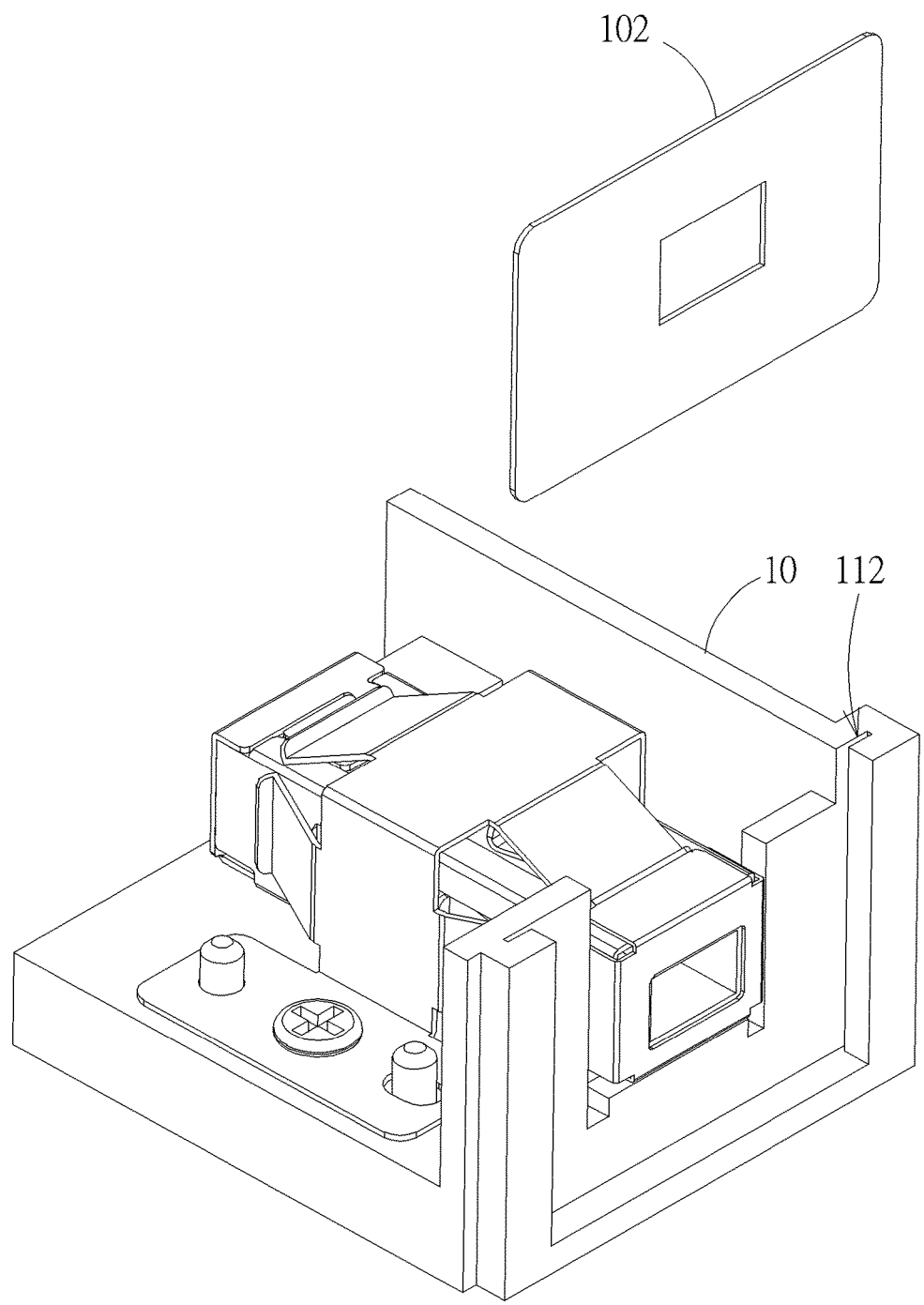
FIG. 15 is a perspective view illustrating the baffle shown in FIG. 14 being detached from the casing.

Referring to FIGS. 14 and 15, FIG. 14 is a perspective view illustrating the casing 10 according to another embodiment of the invention and FIG. 15 is a perspective view illustrating the baffle 102 shown in FIG. 14 being detached from the casing 10. In this embodiment, the baffle 102 is detachably connected to the casing 10. As shown in FIGS. 14 and 15, the casing 10 may have a sliding groove 112. The baffle 102 is slidably disposed in the sliding groove 112, such that the baffle 102 is detachably connected to the casing 10.

Figure 16:
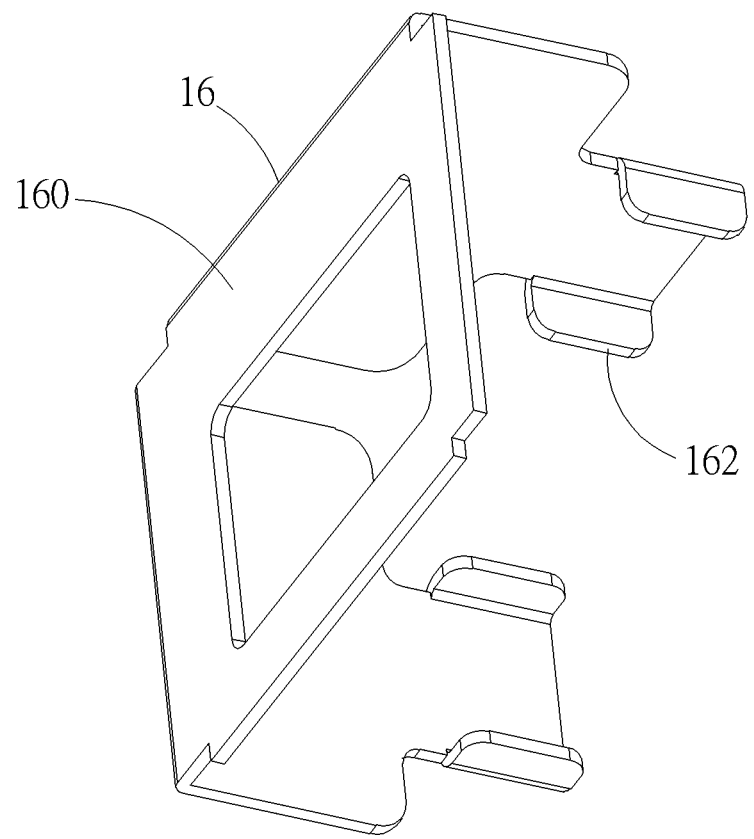
FIG. 16 is a perspective view illustrating the cover according to another embodiment of the invention.

Referring to FIG. 16, FIG. 16 is a perspective view illustrating the cover 16 according to another embodiment of the invention. Compared to the cover 16 shown in FIGS. 3 and 4, the cover 16 shown in FIG. 16 omits two side plates of two adjacent sides.

Figure 17:
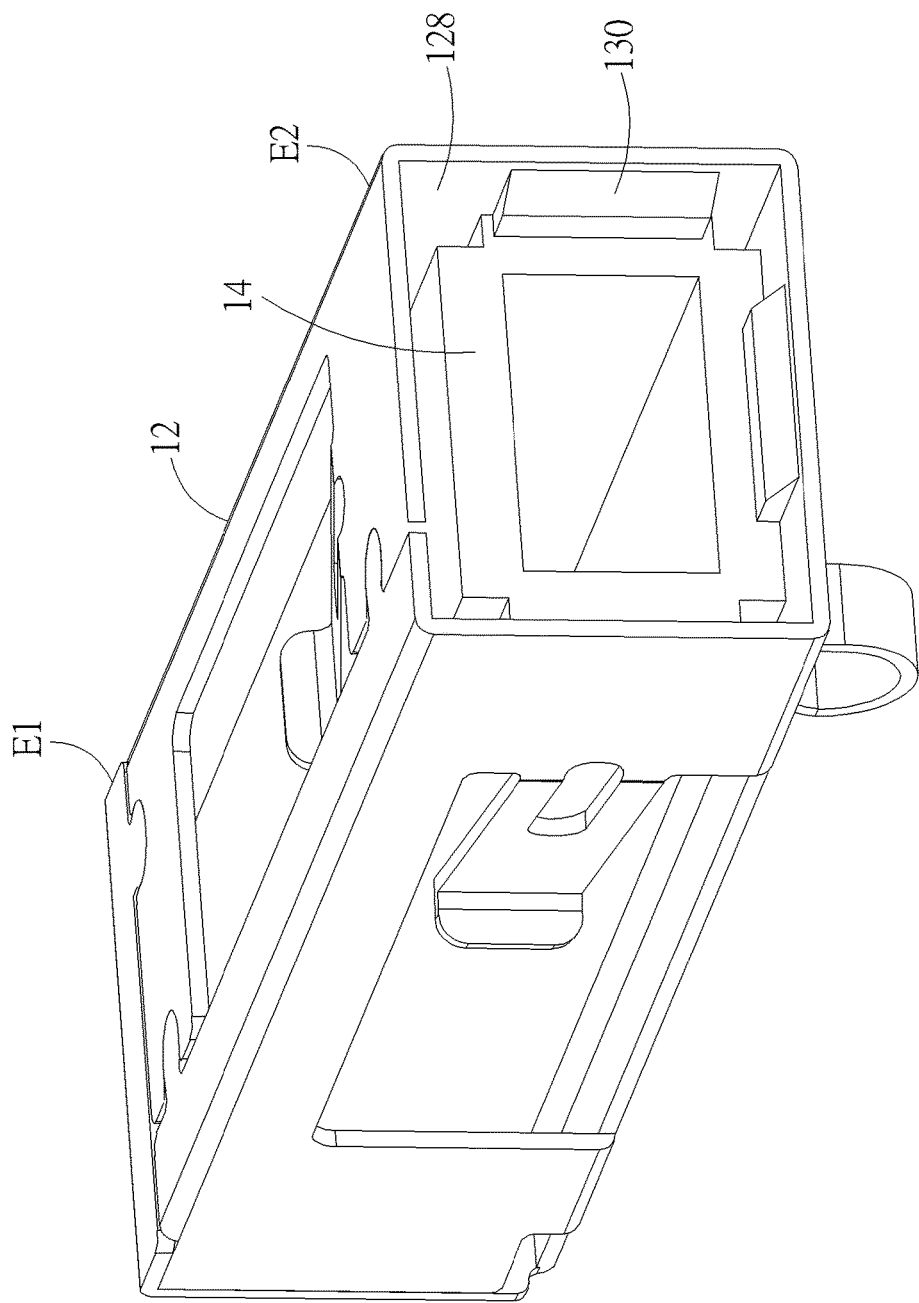
FIG. 17 is a perspective view illustrating the bracket and the light pipe according to another embodiment of the invention.

Referring to FIG. 17, FIG. 17 is a perspective view illustrating the bracket 12 and the light pipe 14 according to another embodiment of the invention. In this embodiment, an inner surface 128 of the bracket 12 has a retaining portion 130 adjacent to the second end E2, as shown in FIG. 17. When the length of the light pipe 14 is smaller than the length of the inner space of the bracket 12, the retaining portion 130 can retain the light pipe 14 in the bracket 12, so as to prevent the light pipe 14 from shifting in the bracket 12.

Figure 18:
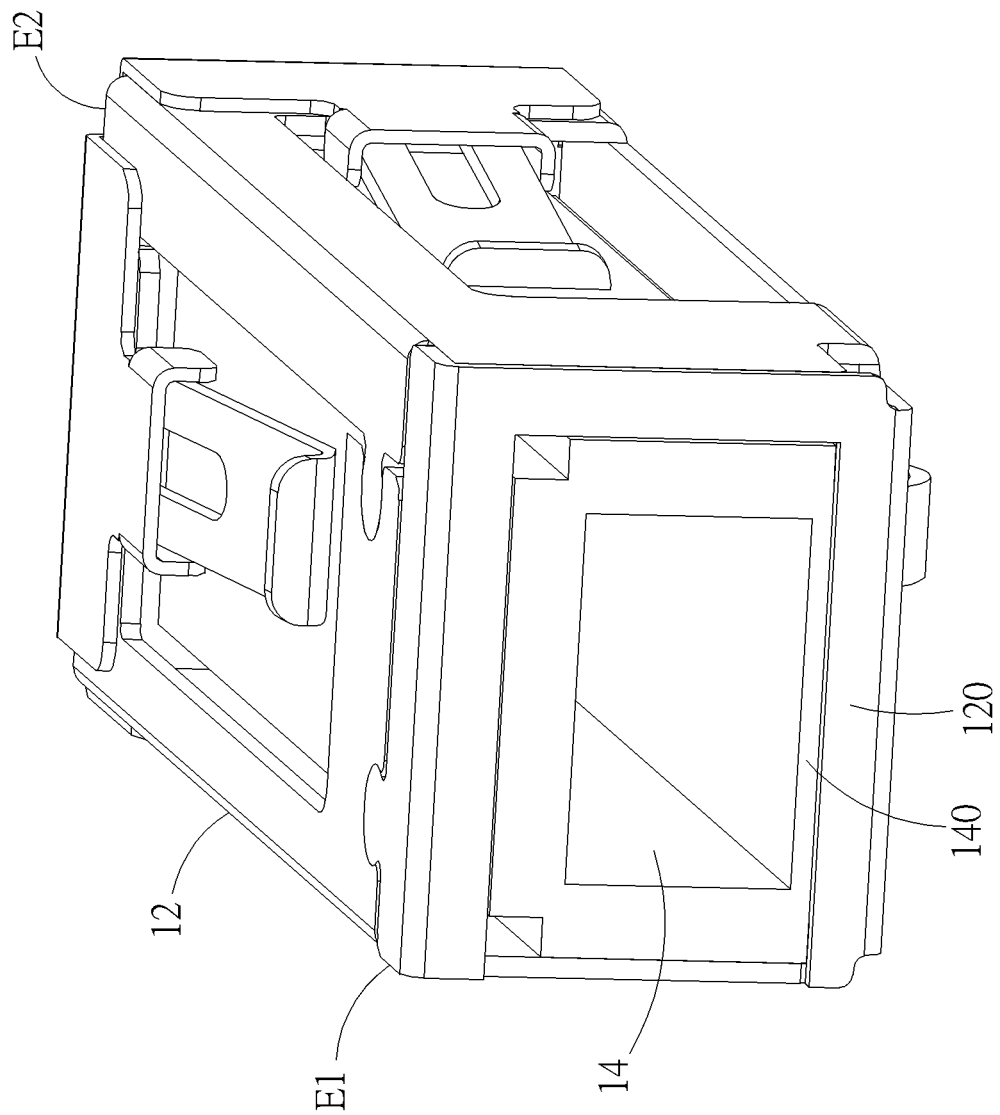
FIG. 18 is a perspective view illustrating the bracket and the light pipe according to another embodiment of the invention.

Referring to FIG. 18, FIG. 18 is a perspective view illustrating the bracket 12 and the light pipe 14 according to another embodiment of the invention. In this embodiment, the first end E1 of the bracket 12 has one single first block portion 120, so as to utilize the first block portion 120 to block one single edge section 140 of the light pipe 14, as shown in FIG. 18. It should be noted that the first block portion 120 may block the edge section 140 wholly or partially according to practical applications.

Figure 19:
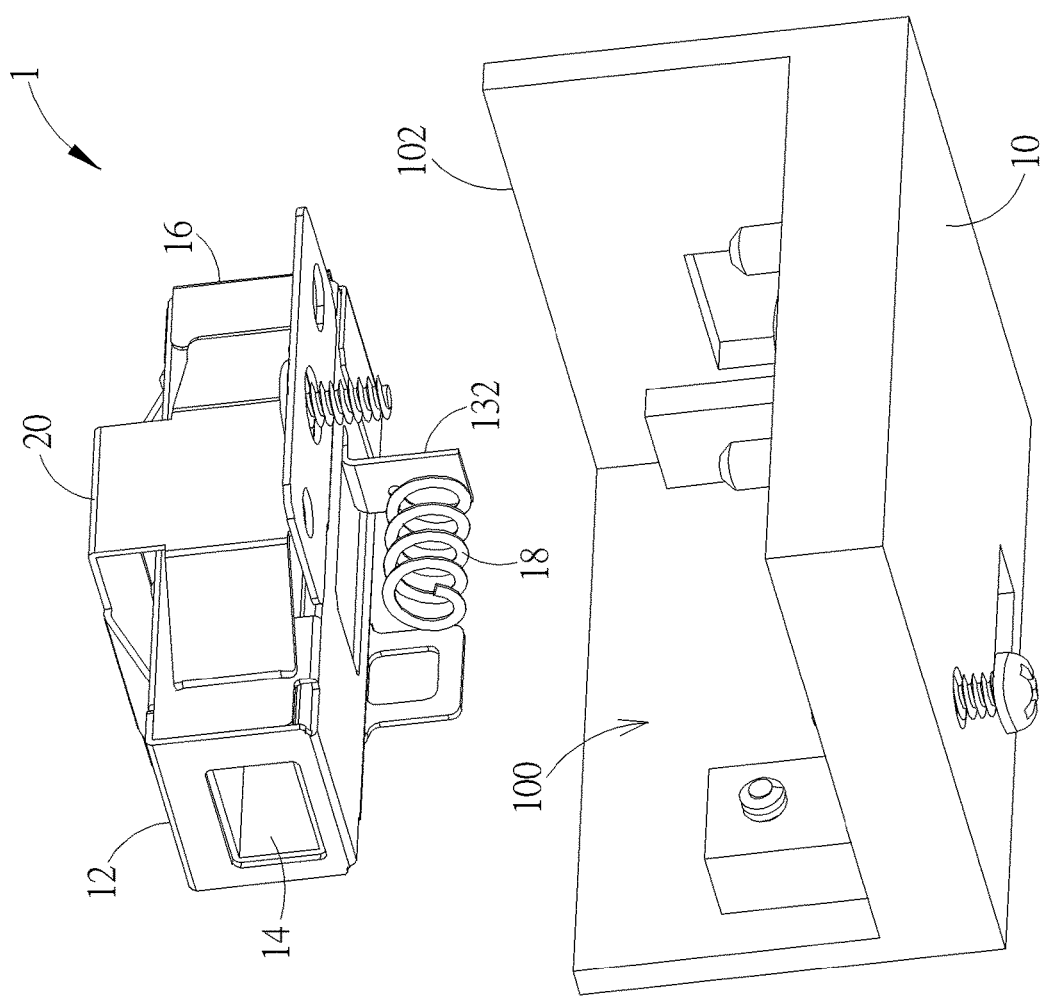
FIG. 19 is an exploded view illustrating the optical engine module according to another embodiment of the invention.
Figure 20:
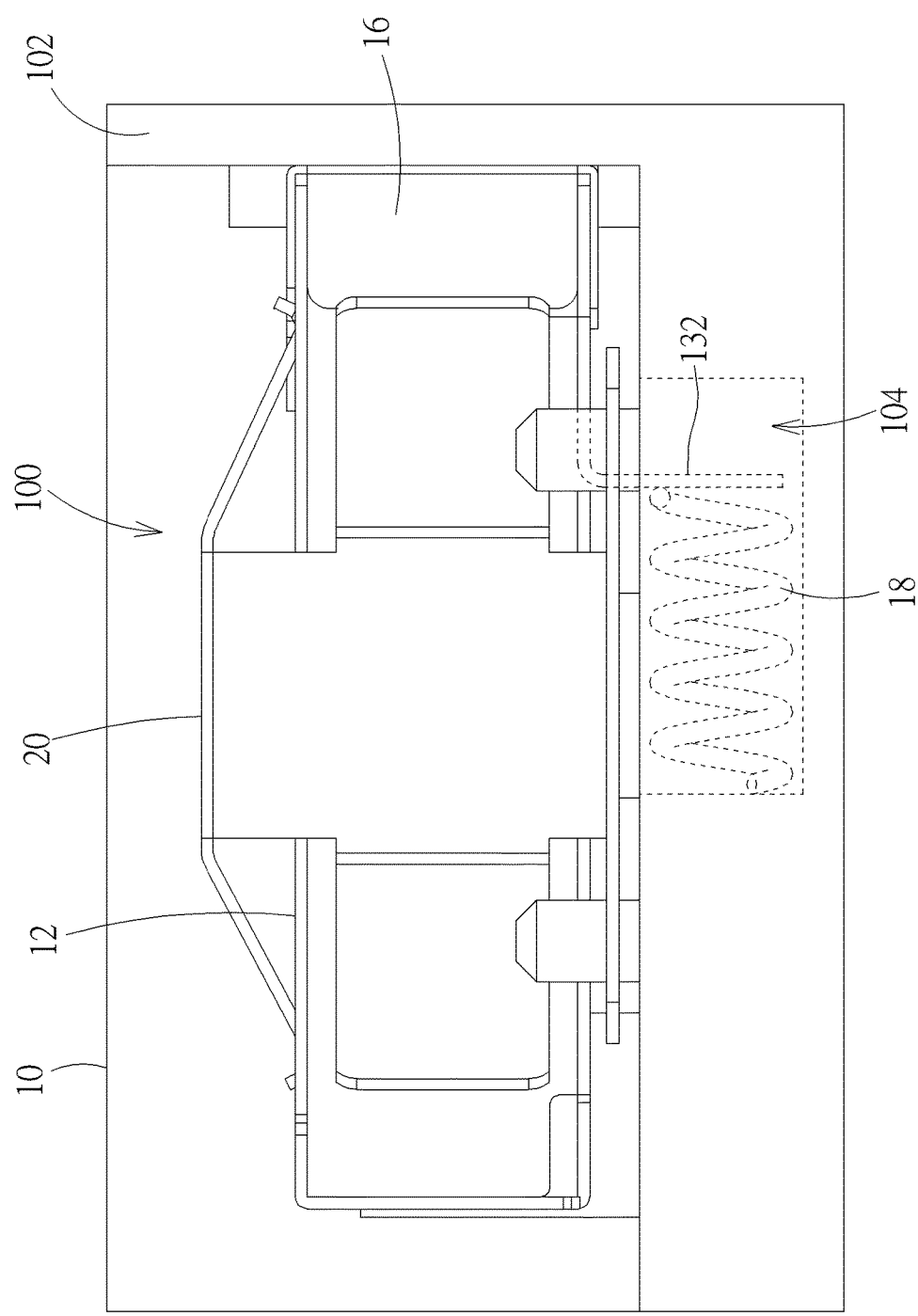
FIG. 20 is side view illustrating the assembly of the optical engine module shown in FIG. 19.

Referring to FIGS. 19 and 20, FIG. 19 is an exploded view illustrating the optical engine module 1 according to another embodiment of the invention and FIG. 20 is side view illustrating the assembly of the optical engine module 1 shown in FIG. 19. In this embodiment, the bracket 12 has a protruding portion 132 and the resilient member 18 is disposed in the recess 104 of the casing 10, as shown in FIGS. 19 and 20. The protruding portion 132 may be formed by bending a part of the bracket 12 from one side. The resilient member 18 may be, but not limited to, a spring. When the bracket 12 is disposed in the accommodating space 100 of the casing 10, the protruding portion 132 of the bracket 12 is embedded in the recess 104 of the casing 10 and compresses the resilient member 18, such that the resilient member 18 generates an elastic force to push the bracket 12 towards the baffle 102.

Figure 8:
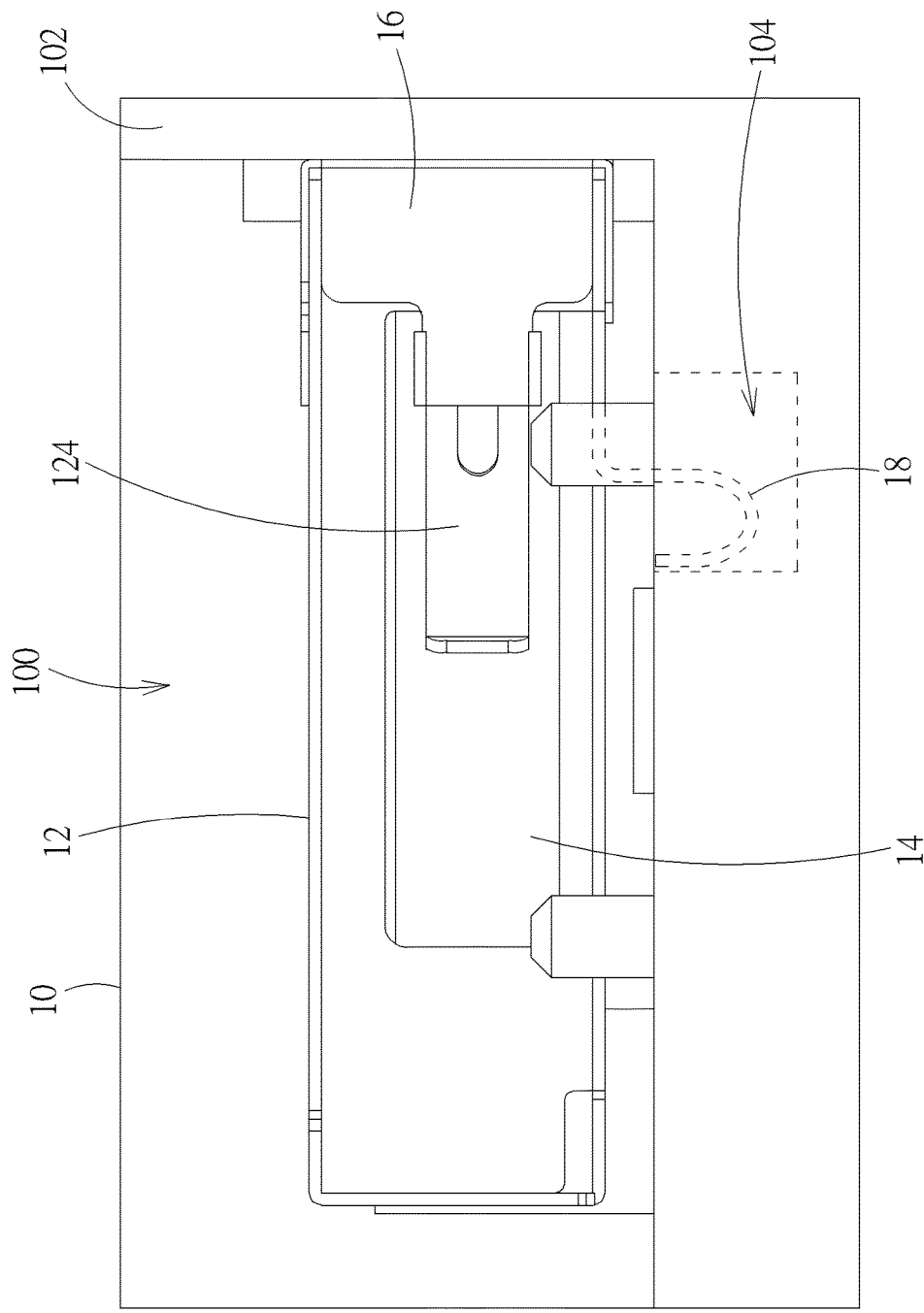
FIG. 8 is a side view illustrating the bracket, the light pipe and the cover shown in FIG. 5 being disposed in the accommodating space of the casing.

Accordingly, the invention may utilize the C-shaped resilient arm shown in FIG. 8 or the spring shown in FIG. 20 to be the resilient member 18, so as to generate the elastic force to push the bracket 12 towards the baffle 102.

As mentioned in the above, the invention disposes the cover on an end of the bracket towards the baffle and utilizes the resilient member to generate the elastic force to push the bracket towards the baffle, such that the cover is compressed by the bracket and abuts against the baffle. At this time, the cover is sandwiched in between the bracket and the baffle, and the light pipe is retained in the bracket by the block portion of the bracket and the cover. Accordingly, the light pipe can be fixed in the bracket and the cover can be fixed on an end of the bracket without glue when assembling the optical engine module of the invention. Since the optical engine module is assembled without glue, the optical engine module can be reassembled with high stability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical engine module comprising:
 a casing having an accommodating space and a baffle, the baffle being located in the accommodating space;
 a bracket, a first end of the bracket having at least one first block portion, the bracket being disposed in the accommodating space, a second end of the bracket being oriented towards the baffle, the first end being opposite to the second end, an inner surface of the bracket having a retaining portion adjacent to the second end;
 a light pipe disposed in the bracket and abutting against the at least one first block portion, the retaining portion retaining the light pipe in the bracket;
 a cover disposed on the second end of the bracket and abutting against the baffle; and
 a resilient member configured to generate an elastic force to push the bracket towards the baffle.

2. The optical engine module of claim 1, wherein the baffle and the casing are formed integrally.

3. The optical engine module of claim 1, wherein the baffle is detachably connected to the casing.

4. The optical engine module of claim 1, wherein the first end of the bracket has four first block portions and the four first block portions block four edge sections of the light pipe.

5. The optical engine module of claim 1, wherein the cover has at least two second block portions and the at least two second block portions block at least two edge sections of the light pipe.

6. The optical engine module of claim 1, wherein the second end of the bracket has at least one first engaging portion, the cover has at least one second engaging portion, and the at least one first engaging portion is engaged with the at least one second engaging portion when the cover is disposed on the second end of the bracket.

7. The optical engine module of claim 1, wherein the resilient member and the bracket are formed integrally, the accommodating space has a recess, and the resilient member is embedded in the recess and deforms elastically to generate the elastic force.

8. The optical engine module of claim 7, wherein the resilient member is a C-shaped resilient arm.

9. The optical engine module of claim 1, wherein the bracket has a protruding portion, the accommodating space has a recess, the resilient member is disposed in the recess, and the protruding portion is embedded in the recess and compresses the resilient member when the bracket is disposed in the accommodating space, such that the resilient member generates the elastic force.

10. An optical engine module comprising:
 a casing having an accommodating space and a baffle, the baffle being located in the accommodating space;
 a bracket, a first end of the bracket having at least one first block portion, the bracket being disposed in the accommodating space, a second end of the bracket being oriented towards the baffle, the first end being opposite to the second end, the second end of the bracket having at least one first engaging portion;
 a light pipe disposed in the bracket and abutting against the at least one first block portion;
 a cover disposed on the second end of the bracket and abutting against the baffle, the cover having at least one second engaging portion, the at least one first engaging portion being engaged with the at least one second engaging portion when the cover is disposed on the second end of the bracket; and
 a resilient member configured to generate an elastic force to push the bracket towards the baffle.

11. The optical engine module of claim 10, wherein the baffle and the casing are formed integrally.

12. The optical engine module of claim 10, wherein the baffle is detachably connected to the casing.

13. The optical engine module of claim 10, wherein an inner surface of the bracket has a retaining portion adjacent to the second end and the retaining portion retains the light pipe in the bracket.

14. The optical engine module of claim 10, wherein the first end of the bracket has four first block portions and the four first block portions block four edge sections of the light pipe.

15. The optical engine module of claim 10, wherein the cover has at least two second block portions and the at least two second block portions block at least two edge sections of the light pipe.

16. The optical engine module of claim 10, wherein the resilient member and the bracket are formed integrally, the accommodating space has a recess, and the resilient member is embedded in the recess and deforms elastically to generate the elastic force.

17. The optical engine module of claim 16, wherein the resilient member is a C-shaped resilient arm.

18. The optical engine module of claim 10, wherein the bracket has a protruding portion, the accommodating space has a recess, the resilient member is disposed in the recess, and the protruding portion is embedded in the recess and compresses the resilient member when the bracket is disposed in the accommodating space, such that the resilient member generates the elastic force.

19. An optical engine module comprising:
a casing having an accommodating space and a baffle, the baffle being located in the accommodating space, the accommodating space having a recess;
a bracket, a first end of the bracket having at least one first block portion, the bracket being disposed in the accommodating space, a second end of the bracket being oriented towards the baffle, the first end being opposite to the second end, the bracket having a protruding portion;
a light pipe disposed in the bracket and abutting against the at least one first block portion;
a cover disposed on the second end of the bracket and abutting against the baffle; and
a resilient member disposed in the recess;
wherein the protruding portion is embedded in the recess and compresses the resilient member when the bracket is disposed in the accommodating space, such that the resilient member generates an elastic force to push the bracket towards the baffle.

* * * * *